United States Patent [19]
Durant et al.

[11] 3,920,822
[45] Nov. 18, 1975

[54] INHIBITION OF HISTAMINE ACTIVITY WITH CYANOGUANIDINES

[75] Inventors: Graham John Durant, Welwyn Garden City; John Colin Emmett, Codicote; Charon Robin Ganellin, Welwyn Garden City, all of England

[73] Assignee: Smith Kline & French Laboratories Limited, Welwyn Garden City, England

[22] Filed: Nov. 14, 1974

[21] Appl. No.: 523,593

Related U.S. Application Data
[62] Division of Ser. No. 384,993, Aug. 2, 1973.

[30] Foreign Application Priority Data
Sept. 5, 1972 United Kingdom............... 41160/72
Feb. 8, 1973 United Kingdom................. 6154/73

[52] U.S. Cl. ............................................... 424/263
[51] Int. Cl.$^2$........................................... A61K 31/44
[58] Field of Search................................... 424/263

[56] References Cited
UNITED STATES PATENTS

| | | | |
|---|---|---|---|
| 3,734,924 | 5/1973 | Black et al.......................... | 424/263 |
| 3,759,944 | 9/1973 | Black et al.......................... | 424/263 |
| 3,806,511 | 4/1974 | Black et al.......................... | 424/263 |

*Primary Examiner*—Norman A. Drezin
*Attorney, Agent, or Firm*—Joan S. Keps; Richard D. Foggio; William H. Edgerton

[57] ABSTRACT

The compounds are cyanoguanidines, for example N-cyano-N'-methyl-N''-[2-((3-hydroxy-2-pyridyl)methylthio)ethyl]-guanidine, which are inhibitors of histamine activity.

9 Claims, No Drawings

INHIBITION OF HISTAMINE ACTIVITY WITH CYANOGUANIDINES

This is a division of application Ser. No. 384,993 filed Aug. 2, 1973.

This invention relates to pharmacologically active compounds, in particular to pharmacologically active cyanoguanidines, to processes of preparing these compounds and methods of inhibiting H-2 histamine receptors with these compounds. The compounds of the invention can exist as the addition salts but, for convenience, reference will be made throughout this specification to the parent compounds.

It has long been postulated that many of the physiologically active substances within the animal body, in the course of their activity, combine with certain specific sites known as receptors. Histamine is a compound which is believed to act in such a way but, since the actions of histamine fall into more than one type, it is believed that there is more than one type of histamine receptor. The type of action of histamine which is blocked by drugs commonly called "antihistamines" (of which mepyramine is a typical example) is believed to involve a receptor which has been designated as H-1. A further group of substances has recently been described by Black et al. (Nature 1972, 236, 385) which are distinguished by the fact that they act at histamine receptors other than the H-1 receptor and these other receptors have been designated as H-2 receptors. This latter group of substances, to certain of which the present invention relates, are thus of utility in inhibiting certain actions of histamine which are not inhibited by the above-mentioned "antihistamines". Black et al., cited above, page 390, column 2, state the following: "Mepyramine has been defined as an $H_1$-receptor antagonist[1] and burimamide has now been defined as an $H_2$-receptor antagonist. Used alone, burimamide can antagonize those responses to histamine, such as stimulation of acid gastric secretion, which cannot be blocked by mepyramine; histamine apparently activates $H_2$-receptors to produce these effects." Thus, from the Black et al. paper, H-2 histamine receptors are those histamine receptors which are not inhibited by mepyramine but are inhibited by burimamide. The substances of this invention may also be of utility as inhibitors of certain actions of gastrin.

Throughout the present specification and claims, by the term "lower alkyl" we mean an alkyl group containing from 1 to 4 carbon atoms.

The cyanoguanidines with which the present invention is concerned may be represented by the following general formula:

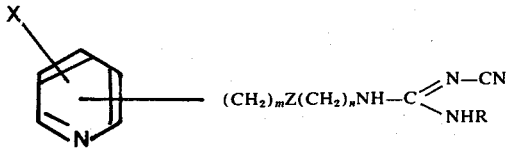

wherein R is hydrogen or lower alkyl such as methyl; X is hydrogen, lower alkyl, trifluoromethyl, hydroxyl, halogen or amino; Z is sulphur or oxygen; $m$ is 0, 1 or 2 and $n$ is 2 or 3, the sum of $m$ and $n$ being 3 or 4; or pharmaceutically acceptable acid addition salts thereof.

It will be understood that the structure illustrated in Formula I is only one of several representations and that other tautomeric forms are also covered by the present invention.

In a preferred group of compounds R is methyl or ethyl. Preferebly also $m$ is 1 and $n$ is 2. Particularly useful specific compounds are
N-cyano-N'-methyl-N''-[2-((3-hydroxy-2-pyridyl)methylthio)ethyl]guanidine,
N-cyano-N'-methyl-N''-[2-((3-bromo-2-pyridyl)methylthio)ethyl]guanidine
and
N-cyano-N'-ethyl-N''-[2-((3-bromo-2-pyridyl)methylthio)ethyl]guanidine.

The compounds of the present invention may be produced from an amine of the Formula II:

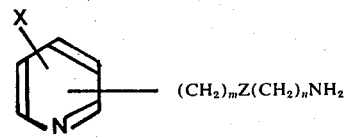

Formula II wherein Z, X, m and n have the same significance as in Formula I by reaction thereof with an isothiourea or isourea of formulae III:

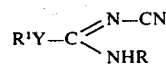

FORMULA III wherein R has the same significance as in Formula I, Y is sulphur or oxygen (preferably sulphur) and $R^1$ is lower alkyl (preferably methyl), aryl or arlalkyl. This reaction may be carried out in the absence of a solvent but preferably is carried out in a solvent such as acetonitrile.

Alternatively, for those compounds of Formula I wherein R is preferably lower alkyl, a thiourea of Formula IV

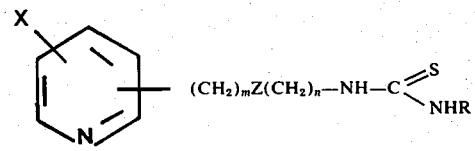

wherein R, Z, X, $m$ and $n$ have the same significance as in Formula I may be reacted with a heavy metal salt of cyanamide such as the lead, mercury or cadmium salt. This process may be conveniently carried out in a solvent such as acetonitrile or dimethylformamide. In a modification of this process the thiourea of Formula IV is first reacted with a desulphurising agent such as a heavy metal salt or oxide and then treated with cyanamide.

An advantageous method for the production of compounds of Formula I is by the reaction of the amine of Formula II with a cyanodithiomidocarbonate or a cyanoimidocarbonate of Formula V:

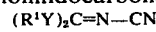

FORMULA V wherein R¹ is alkyl, preferably methyl, and Y is sulphur or oxygen, preferably sulphur to give an N-cyanoisothiourea or N-cyanoisourea of Formula VI

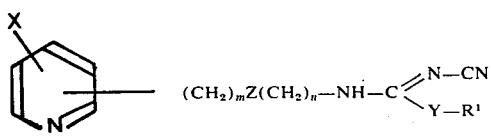

FORMULA VI wherein Z, X, m and n have the same significance as in Formula I and Y and R¹ have the same significance as in Formula V. Subsequent reaction of the compounds of Formula VI with RNH₂ leads to the production of cyanoguanidines of Formula I. Both stages of this reaction may be carried out in a solvent such as ethanol or isopropyl alcohol. In a modification of this method, the compound of Formula V, which in the preferred case is dimethylcyanodithioimidocarbonate, may be reacted sequentially with the amine of Formula II and RNH₂ without isolation of the intermediate compound of Formula VI.

In an alternative method for the production of those compounds of Formula I wherein R is hydrogen, the amine of Formula II may be reacted with a metal salt of dicyanamide of formula MN (CN)₂ wherein M is a metal e.g. an alkali metal such as sodium in an appropriate solvent and in the presence of an equivalent amount of a strong acid.

As stated above, the compounds represented by Formula I have been found to have pharmacological activity in the animal body as antagonists to certain actions of histamine which are not blocked by "antihistamines" such as mepyramine. For example, they have been found to inhibit selectively the histamine-stimulated secretion of gastric acid from the perfused stomachs of rats anaesthetised with urethane, at doses of from 0.5 to 256 micromoles per kilogram intravenously. Similarly, the action of these compounds may, in many cases, be demonstrated by their antagonism to the effects of histamine on other tissues which, according to the above-mentioned paper of Black et al., are H-2 receptors. Examples of such tissues are perfused isolated guinea-pig heart, isolated guinea-pig right atrium and isolated rat uterus. The compounds of the invention have been found to inhibit the secretion of gastric acid stimulated by pentagastrin or by food. In addition to the above the compounds of the invention also show some anti-inflammatory activity in conventional tests.

The level of activity found for the compounds of the present invention is illustrated by the effective dose range in the anaesthetised rat, as mentioned above, of from 0.5 to 256 micromoles per kilogram, given intravenously. Many of the compounds of the present invention produce a 50% inhibition in this test at a dose of from 2 to 10 micromoles per kilogram.

Pharmaceutical compositions comprising a pharmaceutical carrier and a compound of Formula I or a pharmaceutically acceptable acid addition salt thereof and methods of inhibiting H-2 histamine receptors which comprise administering to an animal a compound of Formula I or a pharmaceutically acceptable acid addition salt thereof are also objects of this invention.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like.

A wide variety of pharmaceutical forms can be employed. Thus, if a solid carrier is used, the preparation can be tableted, placed in a hard gelatin capsule in powder or pellet form, or in the form of a troche or lozenge. The amount of solid carrier will vary widely but preferably will be from about 25 mg. to about 1 gm. If a liquid carrier is used, the preparation may be in the form of a syrup, emulsion, soft gelatin capsule, sterile injectable liquid such as an ampoule, or an aqueous or nonaqueous liquid suspension.

The pharmaceutical compositions are prepared by conventional techniques involving procedures such as mixing, granulating and compressing or dissolving the ingredients as appropriate to the desired preparation.

The active ingredient will be present in the composition in an effective amount to inhibit histamine activity. The route of administration may be orally or parenterally.

Preferably, each dosage unit will contain the active ingredient in an amount of from about 50 mg. to about 250 mg., most preferably from about 100 mg. to about 200 mg.

The active ingredient will preferably by administered in equal doses one to three times per day. The daily dosage regimen will preferably be from about 150 mg. to about 750 mg., most preferably from about 300 mg. to about 600 mg.

For therapeutic use, the pharmacologically active compounds of the present invention will normally be administered as a pharmaceutical composition comprising as the or an essential active ingredient at least one such compound in the basic form or in the form of an addition salt with a pharmaceutically acceptable acid and in association with a pharmaceutical carrier therefor. Such addition salts include those with hydrochloric, hydrobromic, hydriodic, sulphuric, picric and maleic acids.

Other pharmacologically active compounds may in certain cases be included in the composition. Advantageously the compositions will be made up in a dosage unit form appropriate to the desired mode of administration, for example as a tablet, capsule, injectable solution or as a cream for topical administration.

The invention is illustrated but in no way limited by the following examples:

EXAMPLE 1

N-Cyano-N'-[2-((3-hydroxy-2-pyridyl)methylthio)ethyl]-N''-methyl guanidine i. A solution of 2-((2-aminoethyl)thiomethyl)-3-hydroxypyridine (7.5 g) in ethanol was added slowly to a solution of dimethylcyanodithioimidocarbonate (6.0 g) in ethanol, with stirring at room temperature. The mixture was set aside overnight at room temperature. Filtration afforded N-cyano-N'-[2-((3-hydroxy-2-pyridyl)methylthio)ethyl]-S-methylisothiourea (4.85 g), m.p. 192°-194°. Recrystallisation from aqueous ethanol gave fine needles, m.p. 196°-198°.

Found: C, 46.6; H, 5.0; N, 19.8; S, 22.7. $C_{10}H_{14}N_4OS_2$
Requires: C, 46.8; H, 5.0; N, 19.8; S, 22.7 ii. A mixture of N-cyano-N'-[2-((3-hydroxy-2-pyridyl)methylthio)ethyl]-S-methylisothiourea (4.8 g) and excess methylamine in ethanol was allowed to stand at room temperature for 2.5 hours. Following concentration under reduced pressure, the residue was chromatographed on a column of silica gel with ethylacetate containing 15% isopropyl alcohol as eluant and recrystillisation from isopropyl alcohol-petroleum ether gave N-cyano-N'-[2-((3-hydroxy-2-pyridyl)methylthio)ethyl]-N''-methylguanidine (2.4 g), m.p. 146°–148°

EXAMPLE 2

N-Cyano-N'-[2-((3-bromo-2-pyridyl)methylthio)ethyl]-N''-methyl guanidine i. A solution sodium nitrite (2.28 g) in water (10ml.) was added dropwise to a stirred mixture of 3-amino-2-hydroxymethylpyridine (4.8 g) in aqueous hydrobromic acid (48%, 10ml) and water (5 ml) at 0.5°C. This solution of the diazonium salt was added to a hot solution of cuprous bromide (2.5 g) in 60% hydromic acid and following cessation of nitrogen evolution the mixture was heated on the steam bath for 0.5 hours, diluted with water and saturated with hydrogen sulphide. Filtration, concentration to low bulk and extraction with chloroform yielded 3-bromo-2-hydroxymethylpyridine (4.8 g). This was dissolved in aqueous hydrobromic acid (48%, 50 ml), cysteamine hydrochloride (3.22 g) added and the solution obtained was heated under reflux for 6 hours. Concentration, followed by recrystallisation from aqueous ethanol afforded 2-((2-aminoethyl)-thiomethyl)-3-bromopyridine dihydrobromide (6.1 g), m.p. 252°–254°.

Found: C, 23.7; H, 3.4; N, 6.7; S, 7.9 $C_8H_{11}Br\ N_2S$. 2HBr
Requires: C, 23.5; H, 3.2; N, 6.9; S, 7.8.

ii. Sequential reaction of dimethylcyanodithioimidocarbonate with 2-((2-aminoethyl)thiomethyl)-3-bromopyridine) and excess methylamine at room temperature in ethanol, the methylamine being added after initial standing overnight and the solution then allowed to stand for a further four hours, followed by chromatographic purification on a column of silica gel with elution by ethyl acetate and final recrystallisation from ethyl acetate-petroleum ether gave N-cyano-N'-[2-((3-bromo-2-pyridyl)methylthio)ethyl]-N''-methylguanidine m.p. 114°–116°.

Found: C, 40.6; H, 4.4; N, 21.4; S, 9.8. $C_{11}H_{14}Br\ N_5S$.
Requires: C, 40.3; H, 4.3; N, 21.3; S, 9.8

EXAMPLE 3

N-Cyano-N'-[2-((3-bromo-2-pyridyl)methylthio)ethyl]-N''-ethylguanidine

Sequential reaction of dimethylcyanodithioimidocarbonate with 2-((2-aminoethyl)thiomethyl)-3-bromopyridine and excess ethylamine, followed by chronatographic purification on a column of selica gel with elution by ethyl acetate and final recrystalllisation from ethyl acetate - petroleum ether afforded N-cyano-N'-[2-((3-bromo-2-pyridyl)methylthio)ethyl]-N''-ethylguanidine, m.p. 123°–124°.

Found: C, 42.2; H, 4.7; N, 20.5; S, 9.4 $C_{12}H_{16}Br\ N_5S$
Requires: C, 42.1; H, 4.7; N, 20.5; S, 9.4.

EXAMPLE 4

Sequential reaction of the following amines
a. 2-[(2-aminoethyl)thiomethyl]-3-aminopyridine.
b. 2-[(2-aminoethyl)thiomethyl]-3-trifluoromethylpyridine.
c. 2-[(3-aminopropyl)thiomethyl]pyridine.
d. 2-[(2-aminoethyl)thiomethyl]-3-methylpyridine.
e. 4-[(2-aminoethyl)thiomethyl]pyridine
f. 2-[2-aminoethoxymethyl]pyridine
g. 2-[(2-aminoethyl)thiomethyl]-5-hydroxypyridine
h. 2-[(2-aminoethyl)thioethyl)pyridine
i. 2-[(3-aminopropyl)thio]pyridine with dimethylcyanodithioimidocarbonate and then excess methylamine according to the method described in Example 2(b) yield respectively the following products:

a. N-cyano-N'-methyl-N''-[2-((3-amino-2-pyridyl)methylthio)ethyl]guanidine.
b. N-cyano-N'-methyl-N''-[2-((3-trifluoromethyl-2-pyridyl)methylthio)ethyl]guanidine.
c. N-cyano-N'-methyl-N''-[3-((2-pyridyl)methylthio)propyl]guanidine.
d. N-cyano-N'-methyl-N''-[2-((3-methyl-2-pyridyl)methylthio)ethyl]guanidine.
e. N-cyano-N'-methyl-N''-[2-((4-pyridyl)methylthio)ethyl]guanidine.
f. N-cyano-N'-methyl-N''-[2-((2-pyridyl)methoxy)ethyl]guanidine.
g. N-cyano-N'-methyl-N''-[2-((5-hydroxy-2-pyridyl)methylthio)ethyl]guanidine.
h. N-cyano-N'-methyl-N''-[2-((2-pyridyl)ethylthio)ethyl]guanidine.
i. N-cyano-N'-methyl-N''-[3-((2-pyridyl)thio)propyl]guanidine.

EXAMPLE 5.

Reaction of the amines set out in Example 4 with dimethylcyanodithioimidocarbonate in ethanol followed by addition to the reaction mixture of ammonia or of butylamine resulted respectively in the production of the corresponding compounds of Formula I wherein R is hydrogen or butyl.

EXAMPLE 6.

| Ingredients | Amounts |
|---|---|
| N-cyano-N'-methyl-N''-[2-((3-hydroxy-2-pyridyl)methylthio)ethyl]guanidine. | 150 mg. |
| Sucrose | 75 mg. |
| Starch | 25 mg. |
| Talc | 5 mg. |
| Stearic acid | 2 mg. |

The ingredients are screened, mixed and filled into a hard gelatin capsule.

EXAMPLE 7

| Ingredients | Amounts |
|---|---|
| N-cyano-N'-methyl-N''-[2-((3-bromo-2-pyridyl)methylthio)ethyl]guanidine. | 200 mg. |
| lactose | 100 mg. |

The ingredients are screened, mixed and filled into a hard gelatin capsule.

We claim:

1. A pharmaceutical composition to inhibit H-2 histamine receptors, said H-2 histamine receptors being those histamine receptors which are not inhibited by mepyramine but are inhibited by burimamide, comprising a pharmaceutical carrier and, in an effective amount to inhibit said receptors, a guanidine compound of the formula:

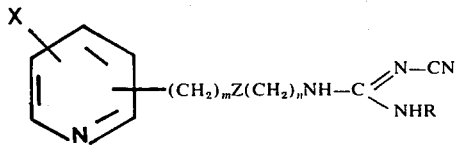

wherein R is hydrogen or lower alkyl; X is hydrogen, lower alkyl, trifluoromethyl, hydroxyl, halogen or amino; Z is sulphur or oxygen; m is 0, 1 or 2 and n is 2 or 3, the sum of m and n being 3 or 4, or a pharmaceutically acceptable acid addition salt thereof.

2. A pharmaceutical composition of claim 1 wherein the guanidine compound is N-cyano-N'-methyl-N''-[2-((3-hydroxy-2-pyridyl)methylthio)ethyl]guanidine.

3. A pharmaceutical composition of claim 1 wherein the guanidine compound is N-cyano-N'-methyl-N''-[2-((3-bromo-2-pyridyl)methylthio)ethyl]guanidine.

4. A pharmaceutical composition of claim 1 wherein the guanidine compound is N-cyano-N'-ethyl-N''-[2-((3-bromo-2-pyridyl)methylthio)ethyl]guanidine.

5. A method of inhibiting H-2 histamine receptors, said H-2 histamine receptors being those histamine receptors which are not inhibited by mepyramine but are inhibited by burimamide, which comprises administering to an animal in need of inhibition of said receptors in an effective amount to inhibit said receptors a guanidine compound of the formula:

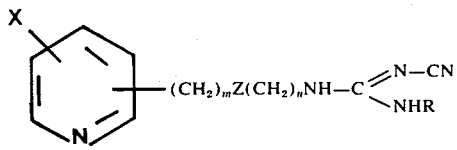

wherein R is hydrogen or lower alkyl; X is hydrogen, lower alkyl, trifluoromethyl, hydroxyl, halogen or amino; Z is sulphur or oxygen; m is 0. 1 or 2 and n is 2 or 3, the sum of m and n being 3 or 4, or a pharmaceutically acceptable acid addition salt thereof.

6. A method of claim 5 wherein the guanidine compound is N-cyano-N'-methyl-N''-[2-((3-hydroxy-2-pyridyl)methylthio)ethyl]guanidine.

7. A method of claim 5 wherein the guanidine compound is N-cyano-N'-methyl-N''-[2-((3-bromo-2-pyridyl)methylthio)ethyl]guanidine.

8. A method of claim 5 wherein the guanidine compound is N-cyano-N'-ethyl-N''-[2-((3-bromo-2-pyridyl)methylthio)ethyl]guanidine.

9. A method of inhibiting gastric acid secretion which comprises administering internally to an animal in need of inhibition of gastric acid secretion in an effective amount to inhibit gastric acid secretion a guanidine compound of the formula:

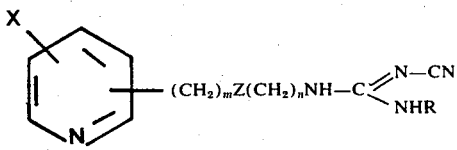

wherein R is hydrogen or lower alkyl; X is hydrogen, lower alkyl, trifluoromethyl, hydroxyl, halogen or amino; Z is sulphur or oxygen; m is 0. 1 or 2 and n is 2 or 3, the sum of m and n being 3 or 4, or a pharmaceutically acceptable acid addition salt thereof.

* * * * *

UNITED STATES PATENT AND TRADEMARK OFFICE
CERTIFICATE OF CORRECTION

PATENT NO. : 3,920,822

DATED : November 18, 1975

INVENTOR(S) : Graham John Durant, John Colin Emmett and Charon Robin Ganellin

It is certified that error appears in the above-identified patent and that said Letters Patent are hereby corrected as shown below:

Column 8, line 11, "0. 1" should read -- 0, 1 -- .

Column 8, line 38, "0. 1" should read -- 0, 1 -- .

Signed and Sealed this second Day of March 1976

[SEAL]

Attest:

RUTH C. MASON
*Attesting Officer*

C. MARSHALL DANN
*Commissioner of Patents and Trademarks*